United States Patent [19]

Tanaka et al.

[11] Patent Number: 5,279,995

[45] Date of Patent: Jan. 18, 1994

[54] ZIRCONIA CERAMICS

[75] Inventors: Hiroaki Tanaka; Yutaka Kimura, both of Funabashi; Masamichi Obitsu, Chiyoda, all of Japan

[73] Assignee: Nissan Chemical Industries, Ltd., Tokyo, Japan

[21] Appl. No.: 38,051

[22] Filed: Mar. 25, 1993

Related U.S. Application Data

[63] Continuation of Ser. No. 730,052, Jul. 15, 1991, abandoned.

[30] Foreign Application Priority Data

Jul. 17, 1990 [JP] Japan ................ 2-188311

[51] Int. Cl.⁵ ............................... C04B 35/48
[52] U.S. Cl. ..................... 501/103; 501/104
[58] Field of Search ................. 501/103, 104

[56] References Cited

U.S. PATENT DOCUMENTS

| | | | |
|---|---|---|---|
| 1,565,472 | 12/1925 | LeCoultre | 501/103 |
| 4,303,447 | 12/1981 | Buchanan et al. | 501/103 |
| 4,360,598 | 11/1982 | Otagiri et al. | 501/103 |
| 4,764,491 | 8/1988 | Quadir | 501/103 |
| 4,985,229 | 1/1991 | Obitsu et al. | 423/608 |

FOREIGN PATENT DOCUMENTS

| | | |
|---|---|---|
| 0294844 | 12/1988 | European Pat. Off. |
| 2587025 | 3/1987 | France . |
| 1201075 | 8/1989 | Japan . |
| 2185011A | 7/1987 | United Kingdom . |
| 2223010A | 3/1990 | United Kingdom . |

*Primary Examiner*—Mark L. Bell
*Assistant Examiner*—Deborah Jones
*Attorney, Agent, or Firm*—Oliff & Berridge

[57] ABSTRACT

A zirconia ceramic composed of crystals which scarcely undergo phase transformation from tetragonal system to monoclinic in the temperature range of from 100° C. to 300° C. even in the presence of water vapor or water is disclosed, said zirconia ceramic comprising at least 93% by weight of partially stabilized zirconia mainly composed of tetragonal crystals and containing mainly $Y_2O_3$ and $ZrO_2$ at the former to the latter molar ratio of from 2/98 to 4.5/95.5 and balance of at least one of the oxides selected from the group consisting of boron oxide, germanium oxide, and gallium oxide, wherein the content of the boron oxide is 1% by weight or less.

7 Claims, No Drawings

ZIRCONIA CERAMICS

This is a continuation of application Ser. No. 07/730,052 filed Jul. 15, 1991 now abandoned.

FIELD OF THE INVENTION

This invention relates to zirconia ceramics applicable to a temperature range of from 100° C. to 300° C.

DESCRIPTION OF THE PRIOR ART

Partially stabilized zirconia ceramics are known to consist mainly of tetragonal system crystals which undergo phase transformation to monoclinic system in the temperature range of from 100° C. to 300° C.; at the transformation, volumetric expansion occurs to the ceramics which finally leads to the disadvantageous loss of strength due to the fine cracks induced on the surface thereof. It is also known that the presence of water vapor or water accelerates the phase transformation from the tetragonal system to monoclinic in the same temperature range.

To suppress the phase transformation from tetragonal system to monoclinic, several countermeasures have been proposed. Such proposals include: (1) methods for reducing the average grain size of zirconia, as described in JP-B-61-21184 (U.S. Pat. No. 4,360,598) and in JP-A-62-246862 (the terms "JP-B-" and "JP-A-" referred to herein signify "examined Japanese patent publication" and "unexamined Japanese patent publication", respectively); (2) preparing solid solution of zirconia with stabilizers added therein, as described in FC Report Vol.5, No.5, pp 161–168, Japan Fine Ceramics Association, 1987; and (3) producing composites of zirconia with other ceramics, as disclosed in JP-A-62-230667 (U.S. Pat. No. 4,360,598). Nevertheless, all of these proposed methods are not satisfactory, and the zirconia ceramics obtained therefrom have difficulties when used under the presence of water or water vapor thereof in the temperature range of from 100° C. to 300° C.

The inventors carried out extensive studies to solve the problems hereinbefore described, and found unexpectedly that specific $ZrO_2$—$Y_2O_3$ system ceramics containing oxides of gallium, germanium, and boron at an amount of 7% by weight or less yield a density near to the theoretical value and that such ceramics scarcely undergo phase transformation in the temperature range of from 100° C. to 300° C. to give the monoclinic phase. The present invention has been completed based on these findings.

An object of the present invention is to provide zirconia ceramics which do not easily undergo phase transformation even in the presence of water vapor or water in the temperature range of from 100° C. to 300° C.

SUMMARY OF THE INVENTION

Accordingly, the present invention provides a zirconia ceramic which is stable in the temperature range of from 100° C. to 300° C., comprising at least 93% by weight of partially stabilized zirconia mainly composed of tetragonal crystals and containing mainly $Y_2O_3$ and $ZrO_2$ at the former to the latter molar ratio of from 2/98 to 4.5/95.5 and balance of at least one of the oxides selected from the group consisting of boron oxide, germanium oxide, and gallium oxide, wherein the content of the boron oxide is 1% by weight or less.

The zirconia ceramics according to the present invention is manufactured by a process which comprises adding at least one of the compounds selected from the compounds of gallium, germanium, and boron, into a calcined zirconia powder mainly composed of tetragonal system grains containing $ZrO_2$ and $Y_2O_3$ at a $Y_2O_3/ZrO_2$ ratio by molar of from 2/98 to 4.5/95.5, and mixing the resulting powder mixture in a wet or dry ball mill. If a dry ball mill were to be used, the as-mixed product is press-molded and sintered, whereas in the case a wet ball mill is used, the mixture is additionally comprises drying before the press molding step. The sintering temperature is in the range of from 1300° C. to 1500° C., preferably in the range of from 1350° C. to 1450° C.

The starting material for use in the present invention is a known calcined zirconia powder containing $Y_2O_3$ making solid solution with $ZrO_2$, at a $Y_2O_3/ZrO_2$ ratio by molar of from 2/98 to 4.5/95.5. The compounds of gallium, germanium, and boron used as additives include, for example, oxides, slats, hydroxides, complexes, and alkoxides.

Boron as the additive is added for 1 wt. % or less, more preferably, in the range of from 0.02 to 0.2 wt. % as $B_2O_3$. If the amount of boron exceeds 1 wt. %, crack generates at the sintering. Gallium is added up to 7 wt. %, more preferably, in the range of from 0.05 to 4 wt. %, and most preferably, in the range of from 0.1 to 0.5 wt. % as $Ga_2O_3$. Germanium is added for 7 wt. % or less, more preferably, in the range of from 0.05 to 4 wt. %, and most preferably, in the range of from 0.1 to 0.5 wt. % as $GeO_2$. Gallium oxide and germanium oxide may each be added in an amount exceeding 7 wt. %, however, those compounds are expensive, and the addition thereof in excess tends to decrease mechanical strength and the density of the zirconia ceramics. Thus, the addition of gallium oxide and germanium oxide in excess is not preferred.

Among the above compounds of boron, gallium, and germanium, at least two compounds can be added under the condition that each of the compounds is added within the range described above, that the content of boron oxide is not more than 1 wt. %, and that the zirconia content is not less than 93 wt. %. If the zirconia content is less than 93 wt. %, the strength and the density of the product tend to be degraded.

Zirconia ceramics thus prepared according to the process hereinbefore described were evaluated for stability by subjecting them to a degradation test which comprises immersing a specimen of the zirconia ceramics into hot water of 121° C. and allowing to stand therein for a duration of 100 hours. In the test, the volumetric fraction, Vm, of the monoclinic crystal phase in the sample was determined from X-ray diffraction peak intensity according to the method described in *Zirconia Ceramics*, Vol.2, pp 53–59 (1984), published by Uchida Rokakuho, to observe the change in Vm, that is, the increase rate of the monoclinic phase The value Vm can be obtained by the equation (1) below $$Vm = 1.311\ Xm\ /(1+0.311\ Xm) \tag{1}$$

where, the peak intensity ratio Xm is defined by equation (2) as follows $$Xm = \{Im(\bar{1}11) + Im(111)\}/\{Im(11\bar{1}) + Im(111) + It(101)\} \tag{2}$$

where, It(101) represents the X-ray diffraction peak intensity for the (101) reflection of a tetragonal crystal, and Im(111) and Im(111) represent those for the (111) and (111) reflections of a monoclinic crystal.

A Vm value of 0.7 or less is preferred in this degradation test. The zirconia ceramics according to the present invention gave a Vm of 0.6 or lower. If the value of Vm exceeds 0.7, cracks may occur on the surface of the sintered body or a part of the surface may peel off, to result in an uneven surface.

As is described in the following examples, the zirconia ceramics according to the present invention do not easily undergo phase transformation in the temperature range of from 100° C. to 300° C. even in the presence of water vapor or water. Thus, the zirconia ceramics according to the present invention are suitable for use as medical knives and cutting tools for hairdressing, to which sterilization by boiling and the like are applied.

The present invention is explained in further detail below referring to examples and comparative examples.

EXAMPLES 1 TO 16

To calcined zirconia powder (trade name "NZP-A3Y", a product of Nissan Chemical Industries, Ltd.) consisting mainly of tetragonal crystal grains and having a $Y_2O_3/ZrO_2$ ratio by molar of 3/97 were added oxides as shown in Table 1, and the mixture was mixed in a wet ball mill. The resulting slurry was then dried and press molded to obtain a molding. The molding was sintered at 1435° C. for two hours to obtain sinterings of zirconia ceramics.

X-ray diffraction peak intensities and density were measured on each of the sintered samples. The degradation test was carried out by immersing the samples into hot water at 121° C. for 100 hours, followed by measuring Vm, the volumetric fraction of the monoclinic phase.

The value Vm can be obtained by the equation (1) below $$Vm = 1.311 \, Xm/(1 + 0.311 \, Xm) \quad (1)$$

where, the peak intensity ratio Xm is defined by equation (2) as follows $$Xm = \{Im(11\bar{1}) + Im(111)\}/\{Im(11\bar{1}) + Im(111) + It(101)\} \quad (2)$$

where, It(101) represents the X-ray diffraction peak intensity for the (101) reflection of a tetragonal crystal, and Im(111) and monoclinic crystal.

The value for Vm before the degradation test was zero for all the samples.

The density of the samples was measured on the Archimedean principle.

After the degradation test, the surface of the samples was dried and observed with an optical microscope (magnification: 50×).

The results are given in Table 1.

COMPARATIVE EXAMPLES 1 TO 8

Sinterings of zirconia ceramics were obtained in the same procedure as described in Example 1, except for using no additives or adding the oxides given in Table 2. The degradation test and the surface observation under an optical microscope as described in the foregoing examples were carried out. The results are also given in Table 2.

TABLE 1

| Example No. | Additive | wt. % | Density | Vm | Surface Observation |
|---|---|---|---|---|---|
| 1 | $B_2O_3$ | 0.03 | 6.06 | 0.55 | O* |
| 2 | $B_2O_3$ | 0.06 | 6.05 | 0.25 | O |
| 3 | $B_2O_3$ | 0.12 | 6.05 | 0.1 | O |
| 4 | $B_2O_3$ | 0.2 | 6.05 | 0.05 | O |
| 5 | $Ga_2O_3$ | 0.1 | 6.07 | 0.59 | O |
| 6 | $Ga_2O_3$ | 0.2 | 6.06 | 0.06 | O |
| 7 | $Ga_2O_3$ | 0.4 | 6.07 | 0.06 | O |
| 8 | $Ga_2O_3$ | 1 | 6.07 | 0.1 | O |
| 9 | $Ga_2O_3$ | 4 | 6.01 | 0.07 | O |
| 10 | $GeO_2$ | 0.1 | 6.06 | 0.55 | O |
| 11 | $GeO_2$ | 0.2 | 6.06 | 0.13 | O |
| 12 | $GeO_2$ | 0.4 | 6.05 | 0.1 | O |
| 13 | $GeO_2$ | 1 | 6.04 | 0.09 | O |
| 14 | $GeO_2$ | 4 | 5.99 | 0.05 | O |
| 15 | $B_2O_3$ $Ga_2O_3$ | 0.03 0.1 | 6.06 | 0.5 | O |
| 16 | $Ga_2O_3$ $GeO_2$ | 3 | 6.01 | 0.05 | O |

*No cracks nor peelings observed on the surface.

TABLE 2

| Comparative Example No. | Additive | wt. % | Density | Vm | Surface Observation |
|---|---|---|---|---|---|
| 1 | None | | 6.07 | 0.9 | x* |
| 2 | $In_2O_3$ | 1 | 6.03 | 0.84 | x |
| 3 | $Nb_2O_5$ | 1 | 6.01 | 0.92 | x |
| 4 | $Ta_2O_5$ | 1 | 6.01 | 0.91 | x |
| 5 | $SnO_2$ | 1 | 6.05 | 0.87 | x |
| 6 | $WO_3$ | 1 | 5.74 | break | —** |
| 7 | $MoO_3$ | 1 | 5.88 | break | — |
| 8 | $B_2O_3$ | 2 | cracks at sintering | | — |

*Cracks or peelings generated on the surface.
**Not measureable.

As clearly shown in Tables 1 and 2, the Vm values for the sintering containing no additive (Comparative Sample No. 1) and those containing In, Nb, Ta, and Sn (Comparative Samples Nos. 2 to 5) are all larger than 0.8, indicating that the content of the monoclinic crystals was higher for all those comparative samples as compared with that of the Examples having added therein additives. Furthermore, surface observation of the Comparative Samples revealed the occurrence of cracks or peeling, an indication of degradation. Comparative Samples No. 6 and No. 7 are sinterings to which W and Mo were added, respectively; however, the samples broke during the degradation test. The Comparative Sample 8, to which boron oxide was added for 2 wt. %, suffered generation of cracks during the sintering.

While the invention has been described in detail and with reference to specific embodiments thereof, it will be apparent to one skilled in the art that various changes and modification can be made therein without departing from the spirit and scope thereof.

We claim:

1. A zirconia ceramic which is stable in the temperature range of from 100° C. to 300° C. comprising at least 93% by weight of partially stabilized zirconia mainly composed of tetragonal crystals comprising $Y_2O_3$ and $ZrO_2$ at the former to the latter molar ratio of from 2/98 to 4.5/95.5 and the balance being at least one oxide selected from the group consisting of boron oxide, germanium oxide, and gallium oxide, wherein the content of the born oxide is from 0.02 to 0.2% by weight and the content of germanium or gallium oxide is 0.05 to 4% by weight.

2. A zirconia ceramic as claimed in claim 1, wherein the oxide is boron oxide.

3. A zirconia ceramic stable in the temperature range of from 100° C. to 300° C. comprising at least 93% by weight partially stabilized zirconia mainly as tetragonal crystals, $Y_2O_3$ and $ZrO_2$ in a molar ratio of $Y_2O_3/ZrO_2$ of from 2/98 to 4.5/95.5 the balance being at least one oxide selected from the group consisting of germanium oxide and gallium oxide.

4. A zirconia ceramic as claimed in claim 3, wherein the content of germanium oxide is from 0.05 to 4% by weight.

5. A zirconia ceramic as claimed in claim 3, wherein the content of gallium oxide is from 0.05 to 4% by weight.

6. A zirconia ceramic as claimed in claim 3, wherein the oxide is germanium oxide.

7. A zirconia ceramic as claimed in claim 3, wherein the oxide is gallium oxide.

* * * * *